Sept. 13, 1960 F. L. MONTROSE 2,952,740

TELEPHONE ATTACHMENT

Filed Feb. 14, 1955 3 Sheets-Sheet 1

FRANK L. MONTROSE,
INVENTOR.

BY Mason & Graham

ATTORNEYS.

FRANK L. MONTROSE,
INVENTOR.
BY Mason & Graham
ATTORNEYS.

Sept. 13, 1960 F. L. MONTROSE 2,952,740

TELEPHONE ATTACHMENT

Filed Feb. 14, 1955 3 Sheets-Sheet 3

FRANK L. MONTROSE,
INVENTOR.

BY Mason & Graham

ATTORNEYS.

United States Patent Office 2,952,740
Patented Sept. 13, 1960

2,952,740

TELEPHONE ATTACHMENT

Frank L. Montrose, 947 N. Oxford Ave., Hollywood 29, Calif.

Filed Feb. 14, 1955, Ser. No. 487,898

4 Claims. (Cl. 179—6)

This invention has to do with telephone instruments and particularly with means attachable thereto for automatically operating the same.

An object of the invention is to provide novel, simple and effective means for automatically making a predetermined telephone call including the automatic dialing of a predetermined telephone number and the giving of a predetermined message. In this connection it is an object to provide a device which readily attaches to a conventional dial telephone instrument of the French type, it being only necessary to remove the handset, place the attachment device over the instrument and then place the handset on top of the device.

It is a particular object to provide in a device of the nature indicated, novel means for automatically dialing a predetermined number or numbers. A further object is to provide a single element which functions to rotate the dial of the telephone and which also functions as a carrier of the desired message.

These and other objects will be apparent from the drawings and the following description.

Referring to the drawings.

Figures 1, 3:
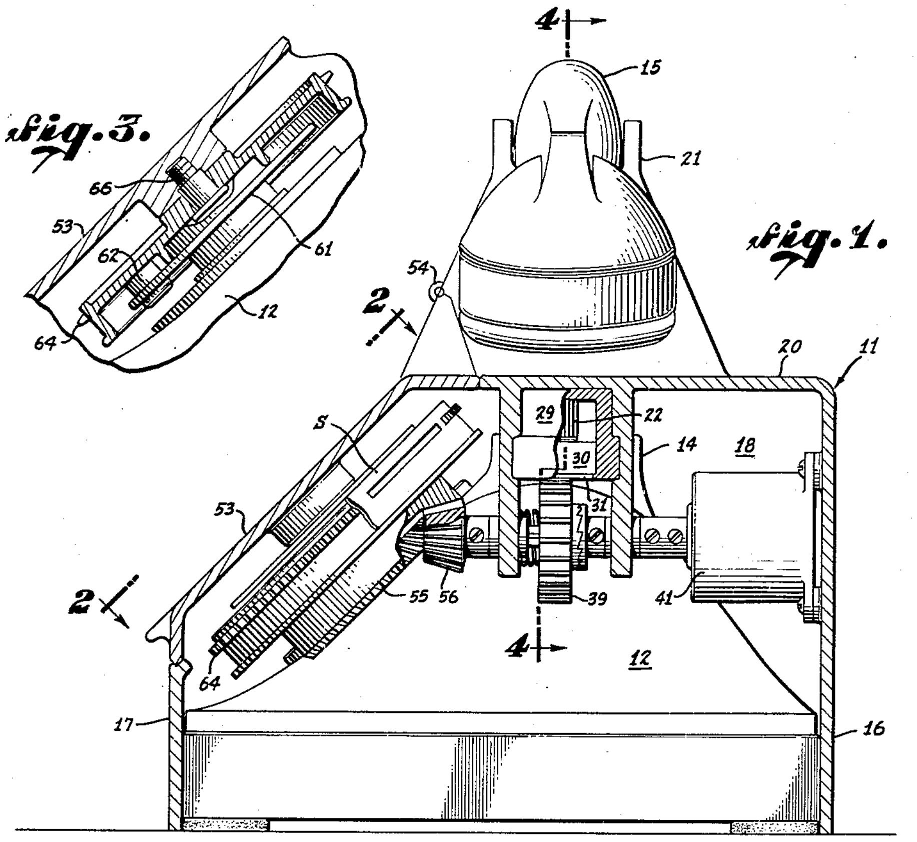
Fig. 1 is a sectional view through a device embodying the invention, the plane of the section being indicated by line 1—1 on Fig. 2.
Fig. 3 is a sectional view on line 3—3 of Fig. 2.

More particularly describing the invention, numeral 11 generally indicates a casing which is adapted to fit over and receive a conventional dial telephone instrument 12 of the so-called French type having a cradle portion 14 at the top for receiving a handset 15. The casing is provided with a rear wall 16, a front wall 17 and end walls 18 and these are designed to closely receive the base portion of the telephone instrument as best shown in Fig. 1.

Figures 4, 5:
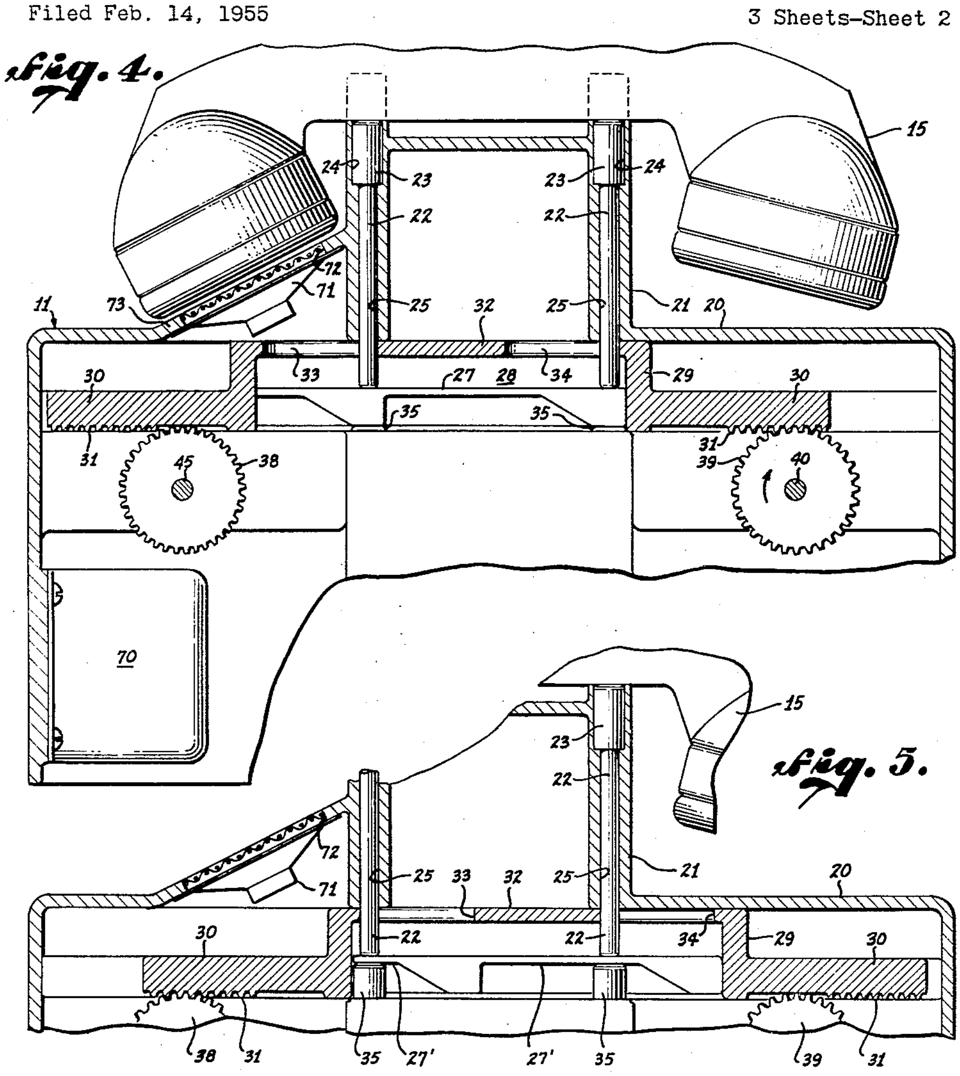
Fig. 4 is a fragmentary view on line 4—4 of Fig. 1.
Fig. 5 is a fragmentary sectional view similar to Fig. 4 but showing the parts in a different position.
Figure 6:
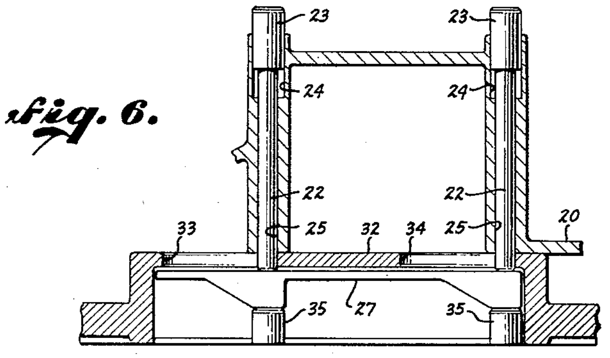
Fig. 6 is a fragmentary view in the same plane as Figs. 4 and 5 showing the relationship of the parts with the telephone handset removed.
Figure 9:
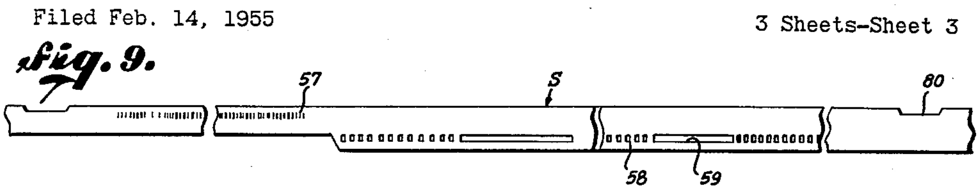
Fig. 9 is a fragmentary face view of a section of a strip of material used to actuate the dial and carry a signal or message.

The casing 11 has an upper wall 20 and above this a cradle 21. The cradle is adapted to receive the handset 15 and is provided with a pair of vertically movable rods 22 having enlarged upper ends 23 received in counterbores 24, the lower portions of the rods being received in bores 25. The rods 22 rest upon a cam bar 27 mounted for limited vertical movement in the central recessed portion 28 of a rack member 29 which forms a cage for the bar. The rack includes end portions 30 with teeth 31 and the central portion 32 of inverted box shape which is slotted at 33 and 34 to freely receive rods 22. In Fig. 4 the rods are shown depressed by the handset and the bar 27 is also depressed and resting upon the two vertically movable switch elements 35 of the telephone instrument. Thus, in this position, the telephone instrument is in the same condition as if the handset were resting upon the cradle of the instrument itself.

In order to provide for allowing the switch elements 35 to rise with the handset in place so that the telephone may be operated without removing the handset, I provide a pair of pinions indicated by 38 and 39, which mesh with the teeth on the rack. Pinion 39 is carried on a shaft 40 of a motor 41, which will be termed the forward motor, since the shaft is driven in the direction of the arrow thereon (Fig. 4). Thus when motor 41 is started it rotates pinion 39 and moves the rack 29 and the bar 27 from the position of Fig. 4 to that of Fig. 5. The recessed portions 27′ of the cam then permit the switch elements 35 of the instrument to rise, readying the instrument for use.

For the purpose of returning the rack 29 and cam bar 27 to their original positions, I provide a reverse motor 44 having a shaft 45 to which is fixed pinion 38. It will be noted that the teeth at each end of the rack are only long enough to permit the pinions to drive the rack the desired distance.

I also provide means for automatically dialing a predetermined number or numbers after the telephone has been readied for use as above described. This means includes a pair of reels indicated by 50 and 51 carried on a plate 53 hingedly mounted to the casing at 54. Reel 51 is driven by the forward motor 41 through the medium of the gears 55 and 56 best shown in Fig. 1. The reel 50 is driven in the opposite direction by the reverse motor 44 which is shown only in the diagrammatic view of Fig. 10. However, the same type of drive train is employed between motor 44 and reel 50 as is employed between motor 41 and reel 51.

The two reels are adapted to carry a strip of material S which is used to actuate or rotate the telephone dial and which carries a signal or sound track 57. The strip of material may be a film or magnetic tape or some other material capable of carrying a signal or message which may be detected and made audible by apparatus suitable for the purpose. The strip of material is provided with a set or several sets of perforations 58 for rotating the telephone dial.

Between the reels 50 and 51 I provide a dial wheel 60 which fits over the conventional dial 61 of the telephone instrument. The member 60 has an inwardly projecting button 62 which is located in the last aperture of the dial 61, that is, the aperture usually designated "Z Operator 0." The dial wheel 60 is formed with a peripheral row of teeth 64 of a size and properly spaced to fit the size and spacing of the individual perforations of the sets of perforations 58 in the strip of material. The dial wheel itself is carried rotatably upon the screw 66 mounted on the inside of the plate 53.

When the forward motor is operating, the strip of material is driven or advanced from reel 50 to reel 51 causing the various sets of perforations to engage the dial wheel. The first set of perforations rotates the dial wheel clockwise a distance corresponding to the length of this set of perforations which is predetermined according to the number desired to be dialed. It is to be noted that between the sets of perforations are spaces 59 so that as the strip of material is advanced it becomes disengaged from the dial wheel between each set of perforations thereby allowing the telephone dial to return to its original position before the dial wheel is again rotated by the next succeeding set of perforations. By regulating the length of each of the individual sets of perforations any number or series of numbers may be dialed.

Figures 8, 10, 11:
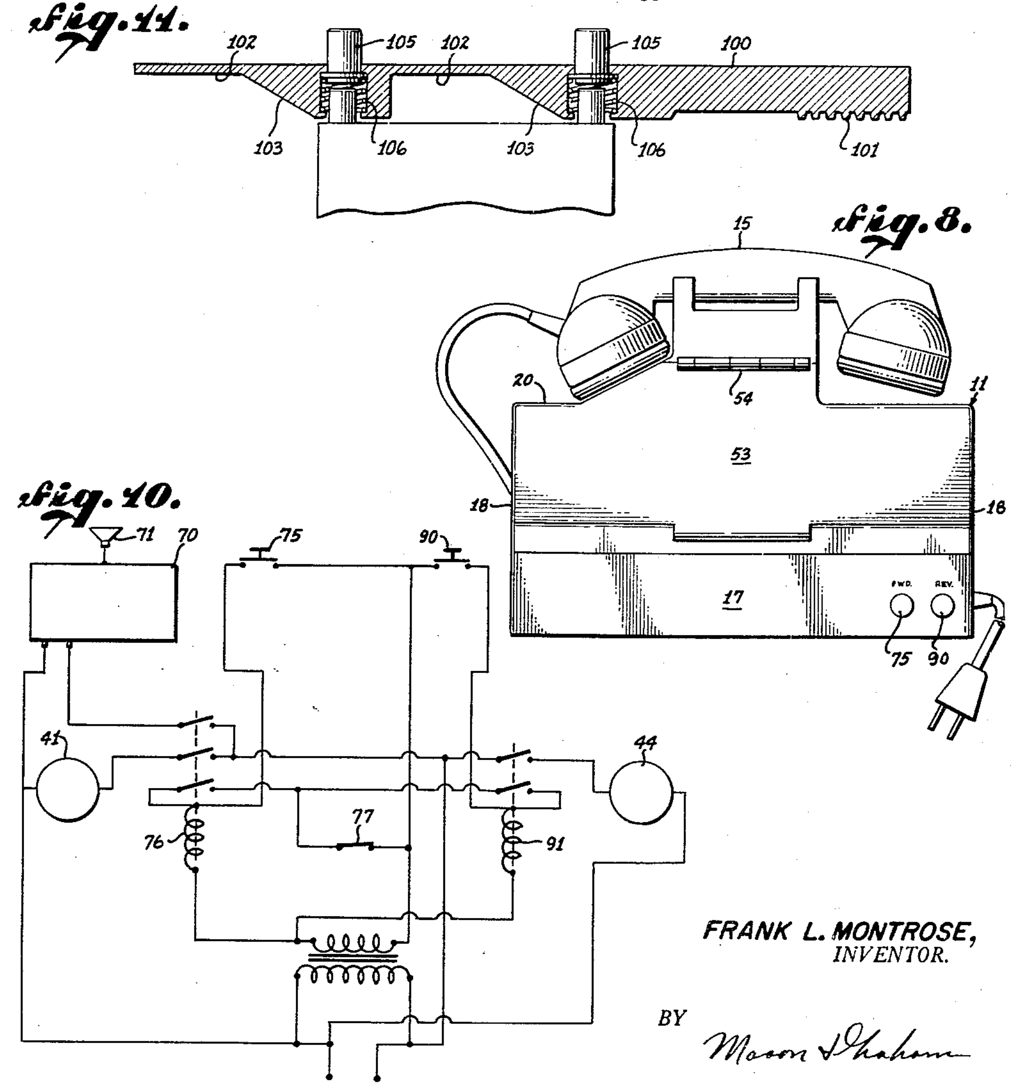
Fig. 8 is a front elevational view of the device.
Fig. 10 is a wiring diagram.
Fig. 11 is a view similar to Fig. 5 but showing a modification.

As previously indicated, the strip of material has a sound track or signal 57 on it. Any conventional means may be utilized for detecting this signal and amplifying it to make it audible, and I show in Fig. 10 diagrammatically a signal reception, detection and amplification means 70 and a speaker member 71. It is the intent that normally the signal should be one which may be reproduced as an intelligible spoken message. The speaker is preferably mounted in the casing in an opening 72 in a wall portion 73 of the casing immediately beneath the position of the transmitting element of the handset when the latter is positioned in the cradle of the device.

Figure 2:
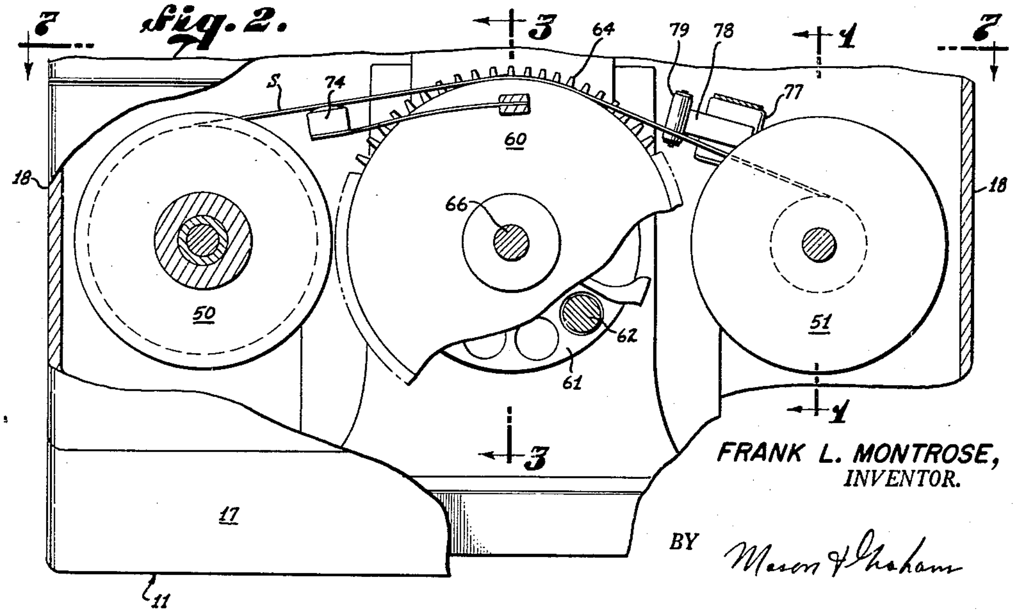
Fig. 2 is a fragmentary view in the plane of line 2—2 of Fig. 1, with the casing broken away to expose the mechanism.

It is to be understood that the nature of the sound or signal reception, detection and amplification means will depend upon the nature of the signal track on the strip of material. For example, if the strip of material is a film, it may have a conventional light sound track thereon and it will be necessary to use means capable of receiving, detecting, amplifying, and audibly reproducing this. On the other hand, it may be that a magnetic tape would be used in which case it would be necessary to use a different type of pickup and reproduction means. A signal pickup head or reception member 74 is shown in Fig. 2 immediately above the strip of material S and the part 74 is, of course, a portion of the means 70.

Figure 7:
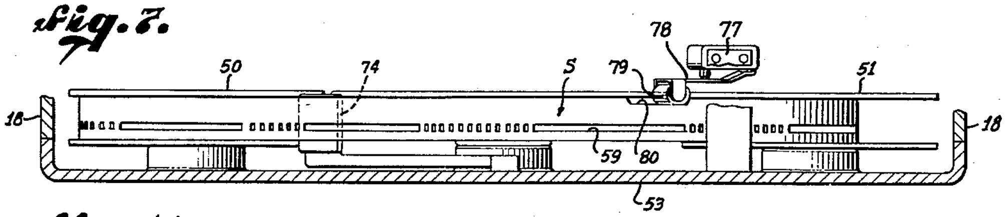
Fig. 7 is a fragmentary sectional view on line 7—7 of Fig. 2.

In operation, to actuate the device, a switch 75 is closed. The switch is shown located on the front of the casing in Fig. 8, but it may be located anywhere or additional switches 75 wired in parallel with each other provided at various remote points. Referring to Fig. 10, when switch 75 is closed, a relay 76 is energized. The latter is held through a holding circuit which is then set up and which passes through a switch 77. This switch (see Fig. 7) is a control switch having an actuating arm 78 carrying a roller 79 which rides against the edge of the strip of material S. The switch is closed except when the roller enters a recess 80 in the edge of material S. A recess 80 is provided near each end of the strip of material so that the switch acts as a limit switch.

Upon energization of the relay 76 a circuit is closed through the forward motor and since this drives the strip of material S, switch 77 is almost immediately closed to complete the holding circuit for relay 76.

The operation of the motor moves the rack 29 and its associated cam bar from the position of Fig. 4 to that of Fig. 5, readying the telephone for the sending of a message. As the strip of material moves past the dial wheel the first set of perforations engage the teeth on the wheel and as the strip of material advances the dialing of the predetermined number is accomplished in the manner previously described. Subsequently the signal reception, detection and amplification means picks up the message or signal on the strip of material and reproduces it audibly through the speaker 71 which is located immediately adjacent the transmitter portion of the handset with the result that the desired message is given over the telephone.

At the conclusion of the message, which may be repeated several times, the operation is stopped by the opening of the holding circuit of the relay as switch 77 opens due to the roller finding a recess 80 in the strip of material at the end of the signal area.

The device may be rewound or reset by closing a reversing switch 90 which energizes a relay 91. This relay closes a circuit through the reversing motor 44. The relay 91 also has its own holding circuit which passes through the switch 77 and this of course is broken when the rewinding has been completed and switch 77 opens in response to entering the recess 80 in the edge of the strip of material S near the forward end thereof.

When it is desired to use the telephone for manual dialing it is only necessary to lift the plate 53 which raises the dial wheel and the reels away from contact with the telephone dial and the pinions 56, respectively.

In Fig. 11 I show another form of means for allowing the switch elements or pins of the telephone to rise when the handset is removed from the auxiliary cradle and for permitting them to rise independently or irrespective of a handset on the auxiliary cradle. This means comprises a rack cam bar 100, the ends of which are provided with rack teeth 101. The central portion has two recessed areas 102 and the cam faces 103. This bar is provided with a pair of vertically movable buttons 105 which are biased upwardly by springs 106. In the normal position of the parts with the telephone not in use the buttons 105 are depressed by the rods 22 when the handset is in the auxiliary cradle thereby depressing the switch means of the instrument. However, when the handset is removed, the switch pins rise as shown in Fig. 11. With the handset on the auxiliary cradle and the buttons 105 depressed the operation of the forward motor is effective to move the bar 100 to the right to free the switch pins 35 and permit them to rise, readying the instrument for making a call automatically.

Although I have illustrated and described a preferred form of my invention, I contemplate that various changes and modifications can be made therein without departing from the invention, the scope of which is indicated by the following claims.

I claim:

1. An attachment for a telephone of the French type having a main unit including a rotatable dial means and presenting a cradle and a handset normally supported in the cradle, said main unit having a vertically movable switch means projecting into the cradle normally held depressed by the handset, comprising a casing adapted to fit over and enclose said main unit and presenting an auxiliary cradle, depressible means carried by said casing actuated by the weight of a handset in said auxiliary cradle to depress said switch means, power-operated release means for permitting said switch means to rise irrespective of the weight of a handset on said depressible means, power-operated dialing means for dialing one or more predetermined numbers, and means for producing an audible signal in the region of the transmitter portion of a handset supported in said auxiliary cradle, said release means, said dialing means and said signal means being constructed and arranged to function in sequence in the order set forth after initial actuation of the device.

2. An attachment for a dial telephone of the French type having a main unit presenting a cradle with a depressible switch element projecting thereinto and a handset normally supported in said cradle and depressing said switch element, comprising a casing, said casing receiving the main unit of the telephone and providing an auxiliary cradle for receiving the handset, vertically movable means engageable by the handset in said auxiliary cradle for depressing said switch element, said vertically movable means including a cam bar engaging said switch element and normally in a first position, said bar being horizontally movable and so shaped as to permit said switch element to rise irrespective of the presence of the handset on said auxiliary cradle when said bar is moved to a second position, a rack formed to act as a cage for the bar, pinion means engageable with the rack to move the same and said bar, and motor means for operating said pinion means.

3. An attachment for a dial telephone of the French type having a main unit presenting a cradle with a depressible switch element projecting thereinto and a handset normally supported in said cradle and depressing said switch element, comprising a casing, said casing receiving the main unit of the telephone and providing an auxiliary cradle for receiving the handset, a vertically movable member in said casing depressible by the handset in said auxiliary cradle, a horizontally movable rack-cam bar between said vertically movable member and the switch element, said rack-cam bar having a vertically movable, upwardly spring biased button normally over said switch element, said vertically movable member resting upon said button whereby the same and the switch element are normally depressed by a handset in said auxiliary cradle, motor-driven pinion means for moving said rack-cam bar, said rack-cam bar being so shaped as to permit said switch element to rise when said bar is moved to a given position.

4. An attachment for a dial telephone of the French type having a main unit presenting a cradle with a depressible switch element projecting thereinto and a handset normally supported in said cradle and depressing said switch element, comprising a casing, said casing receiving the main unit of the telephone and providing an auxiliary cradle for receiving the handset, vertically movable means engageable by the handset in said auxiliary cradle for depressing said switch element, said vertically movable means including a cam member engaging said switch element and normally in one pisition, said cam member being mounted for movement to another position and so shaped as to permit said switch element to rise irrespective of the presence of the handset on said auxiliary cradle when said cam member is moved to said other position, and power-operated means for moving said cam member.

References Cited in the file of this patent

UNITED STATES PATENTS

| | | |
|---|---|---|
| 2,032,190 | Thomas | Feb. 25, 1936 |
| 2,131,565 | Lauersdorf | Sept. 27, 1938 |
| 2,335,039 | Bright | Nov. 23, 1943 |
| 2,371,051 | Kendig | Mar. 6, 1945 |
| 2,579,983 | Thornton | Dec. 25, 1951 |
| 2,656,417 | Kilberg | Oct. 20, 1953 |
| 2,661,394 | Munch | Dec. 1, 1953 |
| 2,674,658 | West | Apr. 6, 1954 |
| 2,827,515 | Zuber | Mar. 18, 1958 |

FOREIGN PATENTS

| | | |
|---|---|---|
| 460,663 | Great Britain | Jan. 26, 1937 |